United States Patent
Ando et al.

(10) Patent No.: US 9,156,164 B2
(45) Date of Patent: Oct. 13, 2015

(54) METHOD FOR ADJUSTING PARAMETERS OF IMPEDANCE CONTROL

(71) Applicant: KABUSHIKI KAISHA YASKAWA DENKI, Kitakyushu-shi (JP)

(72) Inventors: Shingo Ando, Fukuoka (JP); Ryoichi Nagai, Fukuoka (JP); Yasuyuki Inoue, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 65 days.

(21) Appl. No.: 14/085,794

(22) Filed: Nov. 21, 2013

(65) Prior Publication Data
US 2014/0081460 A1 Mar. 20, 2014

Related U.S. Application Data

(62) Division of application No. 12/907,946, filed on Oct. 19, 2010, now Pat. No. 8,626,341.

(30) Foreign Application Priority Data

Oct. 20, 2009 (JP) ................................ 2009-241324

(51) Int. Cl.
*B25J 9/16* (2006.01)
*B25J 13/08* (2006.01)

(52) U.S. Cl.
CPC .............. *B25J 9/1633* (2013.01); *B25J 9/1638* (2013.01); *B25J 9/1641* (2013.01); *B25J 13/085* (2013.01);
(Continued)

(58) Field of Classification Search
CPC .......... B25J 9/1633; B25J 13/085; B25J 9/16; B25J 9/1641; B25J 9/1664; B25J 9/163; G05B 2219/39343; G05B 2219/36429; G05B 2219/39325; G05B 2219/39322; G05B 2219/41387; G05B 2219/39188; G05B 2219/37357; G05B 2219/39347; G05B 2219/39505
USPC ............ 700/245, 250, 251, 260–263; 901/11, 901/14–16, 34, 41
See application file for complete search history.

(56) References Cited

U.S. PATENT DOCUMENTS 5,915,073 A * 6/1999 Maeda .......................... 700/245
6,539,292 B1 3/2003 Ames, Jr.
(Continued)

FOREIGN PATENT DOCUMENTS

JP 2001-277162 10/2001

OTHER PUBLICATIONS

Extended European Search Report for corresponding EP Application No. 10185835.5-1239, Feb. 6, 2012.
(Continued)

*Primary Examiner* — Jason Holloway
(74) *Attorney, Agent, or Firm* — Mori & Ward, LLP

(57) ABSTRACT

In a method for adjusting parameters of impedance control, an overshoot amount allowable value is set as an allowable maximum value of an overshoot amount of a time response of a force feedback from a force sensor provided for an end effector of a robot manipulator, and a setting time allowable value is set as an allowable maximum value of a setting time of the time response of the force feedback. A viscosity parameter with which the setting time is shortest is calculated while fixing the inertia parameter. An overshoot amount adjustment value and a setting time adjustment value which are obtained from a result of the calculating of the viscosity parameter are compared with the overshoot amount allowable value and the setting time allowable value, respectively, to determine whether a repeating process is finished or continued.

6 Claims, 10 Drawing Sheets

(52) U.S. Cl.
CPC ...... *B25J 9/1664* (2013.01); *G05B 2219/36429* (2013.01); *G05B 2219/37357* (2013.01); *G05B 2219/39188* (2013.01); *G05B 2219/39325* (2013.01); *G05B 2219/39343* (2013.01); *G05B 2219/39347* (2013.01); *G05B 2219/39348* (2013.01); *G05B 2219/41387* (2013.01)

(56) References Cited

U.S. PATENT DOCUMENTS

| | | | |
|---|---|---|---|
| 7,652,446 B2 | 1/2010 | Lin et al. | |
| 8,175,750 B2 * | 5/2012 | Tsusaka | 700/257 |
| 8,280,552 B2 * | 10/2012 | Takesue et al. | 700/260 |
| 8,290,621 B2 * | 10/2012 | Tsusaka | 700/257 |
| 2004/0230325 A1 | 11/2004 | Ramamoorthy et al. | |
| 2006/0195236 A1 | 8/2006 | Katsuta et al. | |
| 2008/0253752 A1 | 10/2008 | Lin et al. | |
| 2009/0171505 A1 * | 7/2009 | Okazaki | 700/258 |
| 2010/0152896 A1 * | 6/2010 | Komatsu et al. | 700/258 |
| 2011/0178638 A1 * | 7/2011 | Tsusaka et al. | 700/257 |
| 2013/0030569 A1 * | 1/2013 | Fudaba et al. | 700/245 |

OTHER PUBLICATIONS

Toshio Tsuji et al., Neural Network Learning of Robot Arm Impedance in Operation Space, Apr. 1996, IEEE Transactions.

* cited by examiner

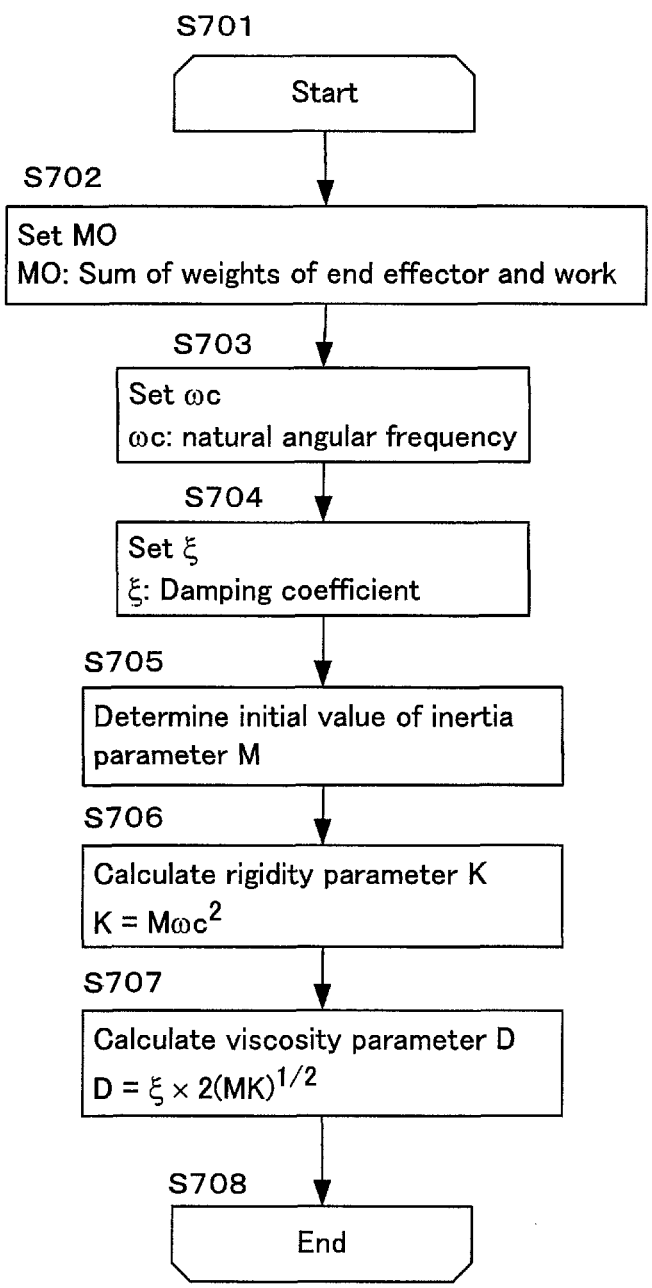

METHOD FOR ADJUSTING PARAMETERS OF IMPEDANCE CONTROL

CROSS-REFERENCE TO RELATED APPLICATIONS

The present application is a divisional application of the U.S. patent application Ser. No. 12/907,946 filed Oct. 19, 2010, which claims priority under 35 U.S.C. §119 to Japanese Patent Application No. 2009-241324 filed Oct. 20, 2009. The contents of these applications are incorporated herein by reference in their entirety.

BACKGROUND OF THE INVENTION

1. Field of the Invention

The present invention relates to a method for adjusting parameters of impedance control.

2. Discussion of the Background

There is a widely known technique that, in the case of executing a contact work such as mating by using an industrial robot, a force sensor is attached to an end effector or a wrist part of a robot manipulator, and force control using information of the force sensor is performed. As a force control method, for example, impedance control is easily used.

In the impedance control, feedback control is performed so that a response of a position when an external force acts on an end effector is obtained according to desired inertia, viscosity, and rigidity characteristics. By the control, a force generated when workpieces (objects to be worked) come into contact with each other at the time of a mating operation is passed off, and a positional error can be absorbed. However, if the parameters such as inertia, viscosity, and rigidity are improper, it may take an extremely long time to execute the operation. There is a case that a control system becomes unstable (oscillates) at the time of contact and the operation cannot be performed. Consequently, the parameters of the impedance control have to be properly adjusted.

Japanese Unexamined Patent Application Publication No. 2001-277162 discloses a technique of adjusting parameters of the impedance control.

In the publication, an adjustment worker (teacher) adjusts behavior designation parameters of weight (heavy and light) and hardness (hard and soft) by a button operation while recognizing a force response on a display unit and, based on the behavior designation parameters, adjusts impedance parameters by the fuzzy inference.

SUMMARY OF THE INVENTION

According to one aspect of the present invention, in a method for adjusting parameters of impedance control, initial values of an inertia parameter and a viscosity parameter which are set at a time of parameter adjustment is calculated. An overshoot amount allowable value is set as an allowable maximum value of an overshoot amount of a time response of a force feedback from a force sensor provided for an end effector of a robot manipulator, and a setting time allowable value is set as an allowable maximum value of a setting time of the time response of the force feedback. A viscosity parameter with which the setting time is shortest is calculated while fixing the inertia parameter. An overshoot amount adjustment value and a setting time adjustment value which are obtained from a result of the calculating of the viscosity parameter are compared with the overshoot amount allowable value and the setting time allowable value, respectively, to determine whether a repeating process is finished or continued. If it is determined that the repeating process is continued, the inertia parameter or one of the overshoot amount allowable value and the setting time allowable value is adjusted to re-execute the calculating of the viscosity parameter. The adjusting of the inertia parameter or one of the overshoot amount allowable value and the setting time allowable value includes changing the inertia parameter or lessening at least one of the overshoot amount allowable value and the setting time allowable value.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 10 is a flowchart of a calculator of an initial parameter of the embodiment.

DESCRIPTION OF THE EMBODIMENTS

Figure 1:
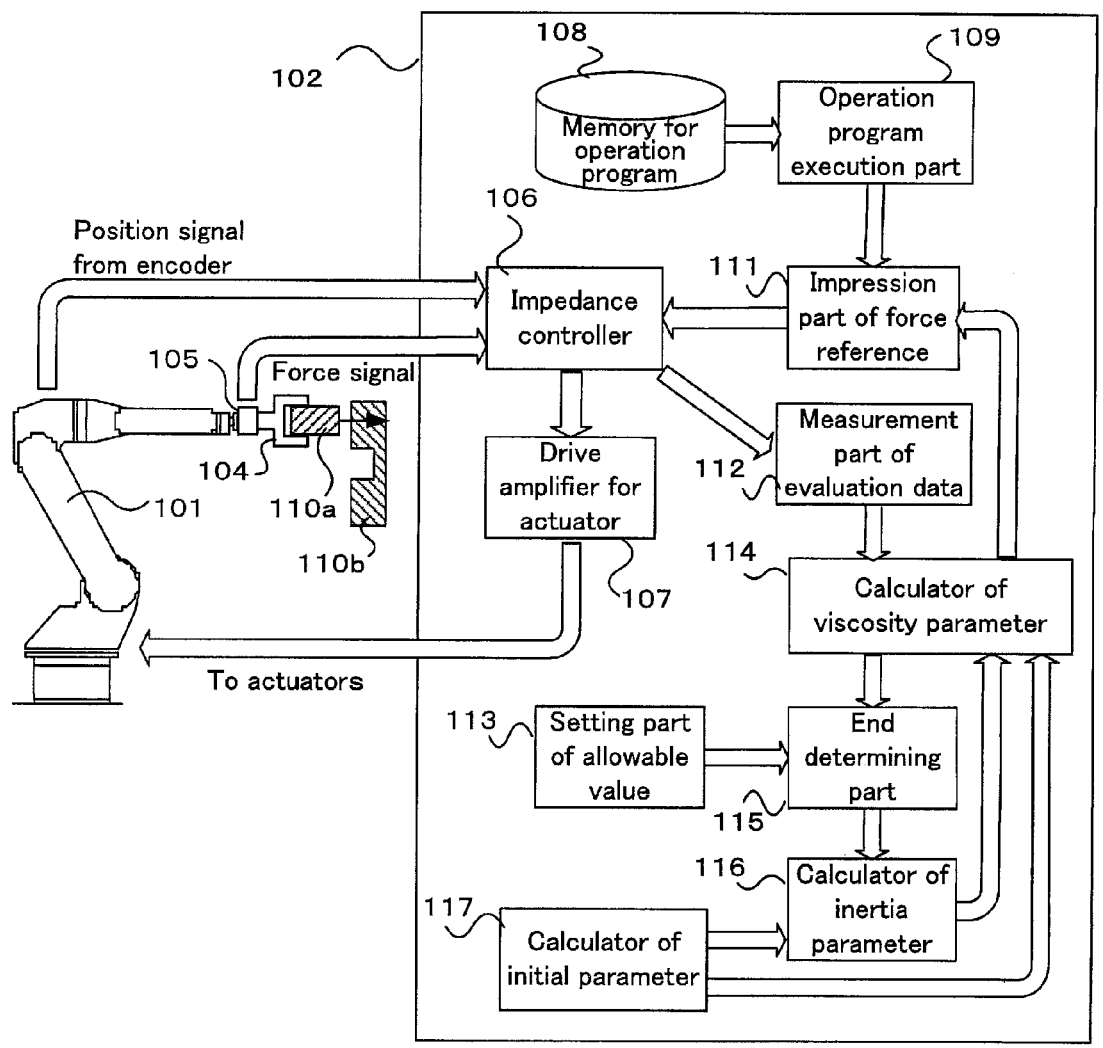
FIG. 1 is a configuration diagram of an impedance control parameter adjusting apparatus according to an embodiment.

Embodiments will now be described with reference to the accompanying drawings, wherein like reference numerals designate corresponding or identical elements throughout the various drawings.

First, a system configuration of a general industrial robot and impedance control and, after that, techniques related to the embodiment will be described.

Figure 7:
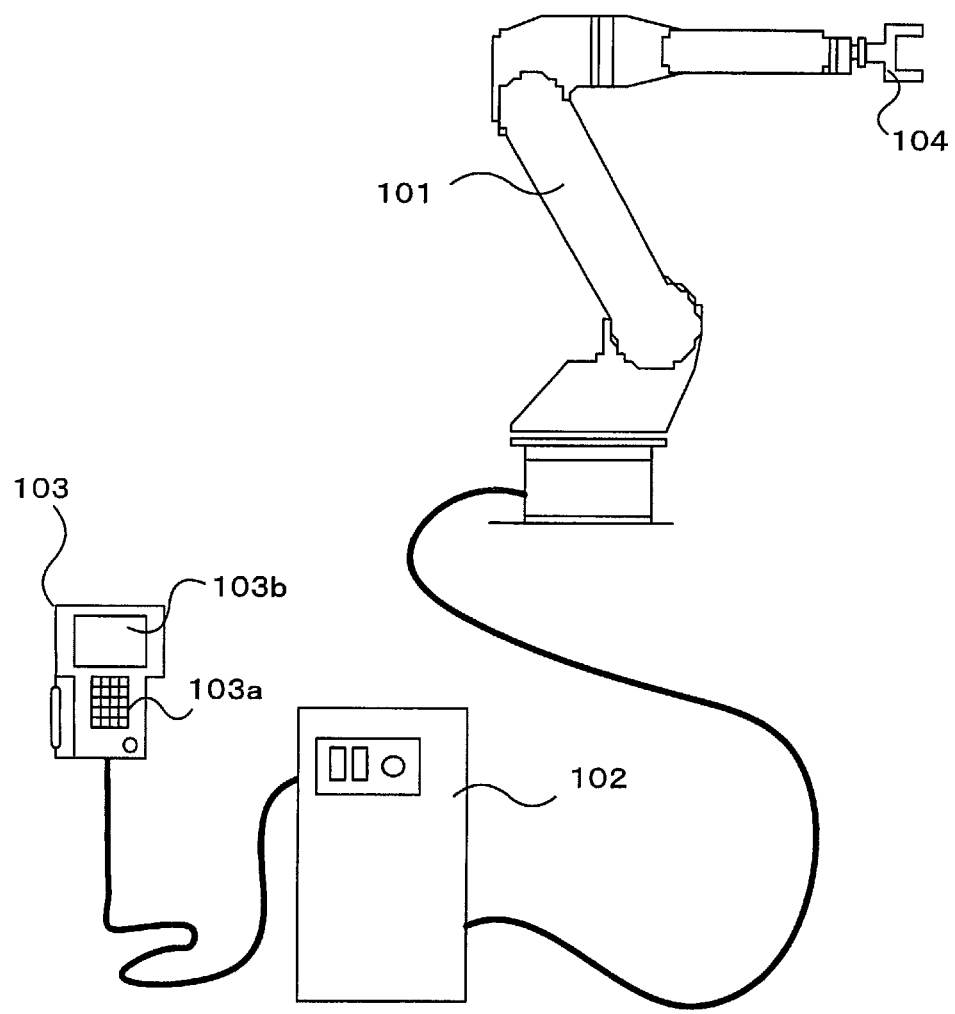
FIG. 7 is a configuration diagram of an industrial robot of the embodiment.

FIG. 7 is a configuration diagram of a general industrial robot. The configuration diagram shows a manipulator, a controller, and a portable teaching operation panel. In FIG. 7, a robot 101 is a manipulator having a plurality of joint axes and links. In each of the joint axes, a drive motor with an encoder is provided. The axes can be driven independently of each other. A controller 102 for the robot 101 is an apparatus for performing a feedback control (positional control system) based on an encoder signal of each of the joint axis drive motors and for controlling motion of the robot 101. A portable teaching operation panel 103 is an interface used by the teacher to manually (JOG) operate the robot and to create and edit an operation program. The portable teaching operation panel 103 has, mainly, an operation button group 103a and a display screen 103b. An end effector 104 is provided at the wrist of the robot 101. To the end effector, various tools are attached according to applications. In the case of FIG. 7, a hand (gripper) for gripping a part is attached.

Figure 8:
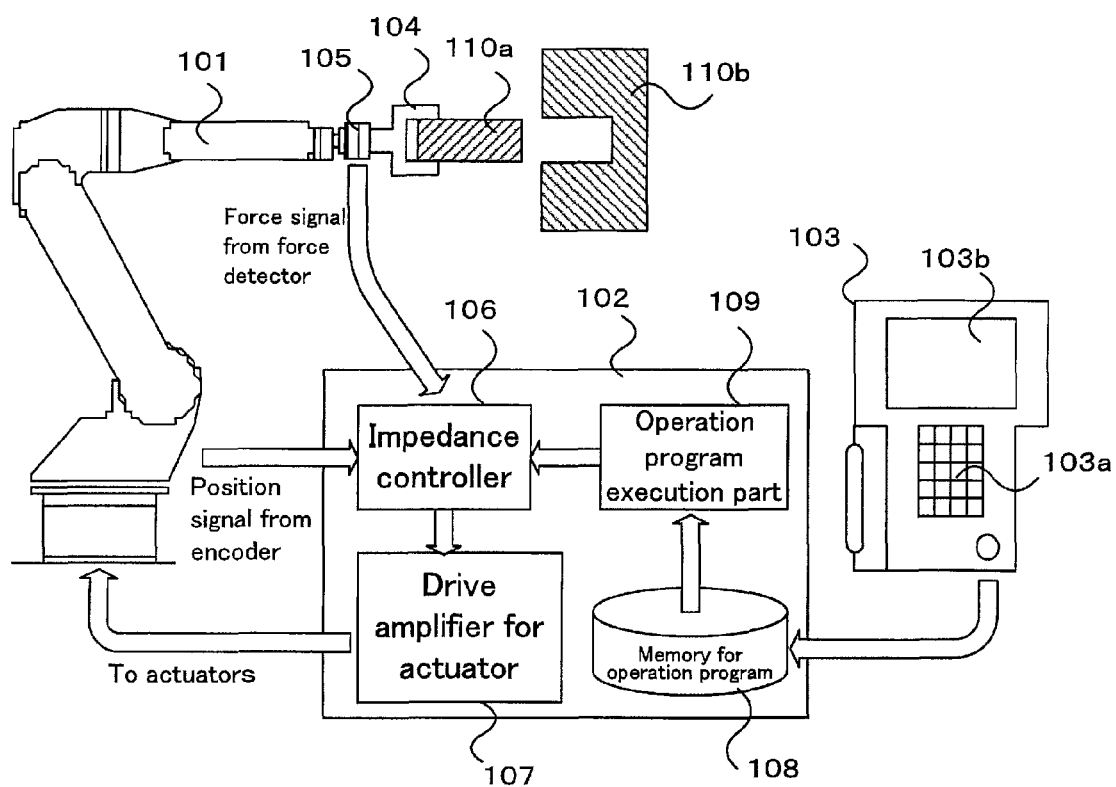
FIG. 8 is a configuration diagram of an industrial robot which is impedance controlled according to the embodiment.

FIG. 8 is a configuration diagram of an industrial robot which is impedance controlled. A six-axis force sensor 105 is attached to the wrist of the robot 101. The six-axis force sensor can measure forces in the X, Y, and Z-axis directions and moments about the axes. An impedance controller 106 is constructed in the controller 102. The impedance controller 106 is used to perform a feedback control system based on signals from the force sensor 105 and the axis encoders. From the impedance controller 106, a torque reference or a current reference of each of the drive motors is outputted to a drive amplifier 107 for an actuator. Based on the torque (or current) reference value, the drive amplifier 107 for the actuator supplies power to each of the drive motors. A memory 108 for an operation program stores an operation program created (taught) by the portable teaching operation panel in the controller. An operation program execution part 109 interprets/executes the operation program stored in the memory 108 for the operation program and gives an operation reference to the impedance controller 106. There are provided a workpiece 110a (for example, a mating part) gripped by the end effector 104 and a target workpiece 110b (for example, a part to be mated). In a mating work as an example, by setting the robot 101 in an impedance control state and properly adjusting the parameters, position and orientation errors are allowed and the parts can be mated with each other.

Figure 9:
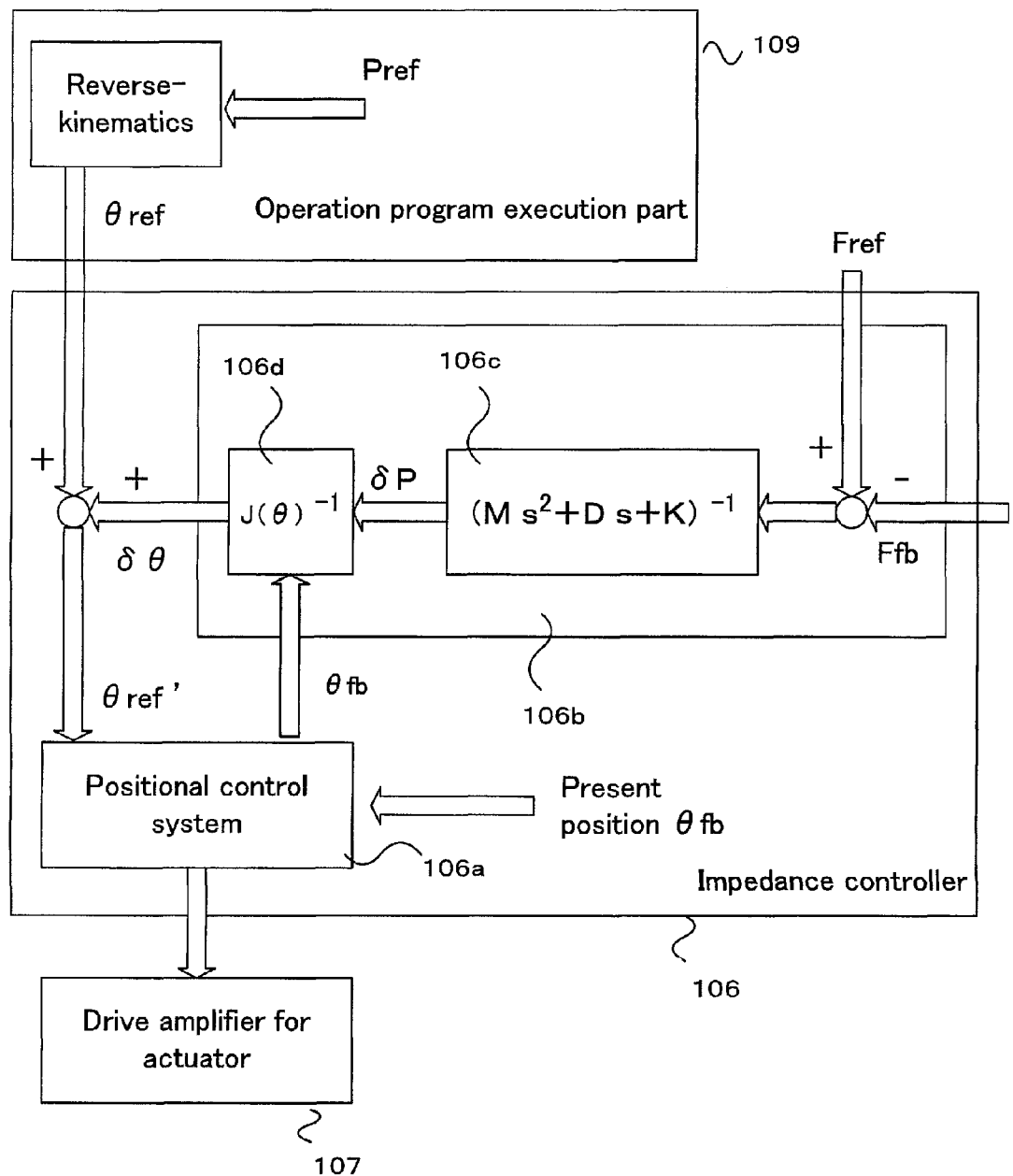
FIG. 9 is a block diagram of the impedance control of the embodiment.

FIG. 9 is a control block diagram of the impedance control. In FIG. 9, a positional control system 106a outputs a torque (or current reference) of each of the drive motors to the drive amplifier 107 for the actuator based on the position reference of each joint axis and a present position (feedback). Fref indicates a force moment reference (force moment target value), and Ffb indicates a force moment feedback value. θref indicates a position reference (joint coordinate system) sent from the operation program execution part 109, and δθ indicates a position correction amount calculated by an impedance control operation part 106b. In the impedance control operation part 106b, first, based on Fref and Frb, a position correction amount δP in an orthogonal coordinate system is calculated in accordance with the following equation (impedance model 106c).

$$\delta P = (Ms^2 + Ds + K)^{-1}(Fref - Ffb) \quad (1)$$

Where M, D, and K denote an inertia matrix, a viscosity coefficient matrix, and a rigidity matrix (spring constant), respectively. Usually, using those as diagonal matrixes, impedance characteristics independent of one another in the different axis directions are set. Here, "s" denotes a Laplace operator and corresponds to a first derivation related to time.

The position correction amount δP in the orthogonal coordinate system is broken down to a position correction amount 80 in the joint coordinate system by the following equation using a Jacobian matrix J(θ) (velocity resolution operation unit 106d).

$$\delta\theta = J(\theta)^{-1}\delta P \quad (2)$$

By giving a position reference θref' obtained by adding δθ to θref to the positional control system 106a, the robot operates while maintaining the characteristics designated by M, D, and K to an external force and a moment. For example, when the robot operates like a spring in response to an external force by the rigidity matrix K, by reducing the inertia matrix M and the viscosity coefficient matrix D, the robot operates lightly and smoothly.

The embodiment relates to the technique of adjusting the inertia M and the viscosity D in the three parameters.

Figure 5A:
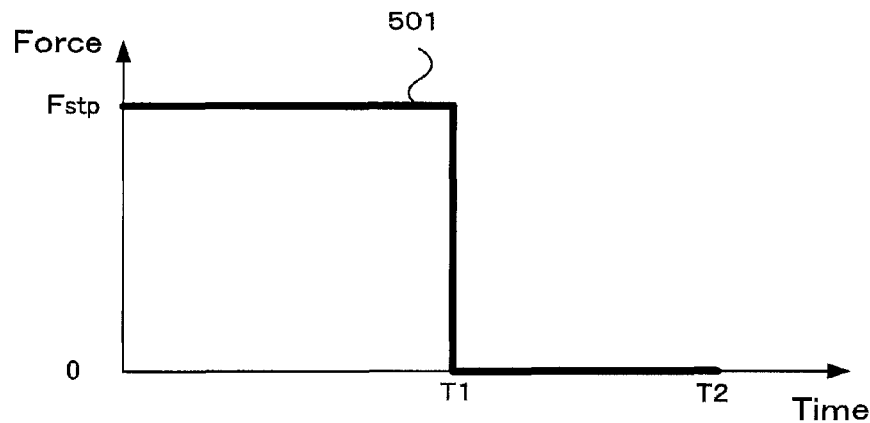
FIG. 5A shows an example of a force reference which is outputted from an impression part of force reference of the embodiment.

FIG. 1 is a configuration diagram of an impedance control apparatus according to the embodiment. The apparatus in FIG. 1 is roughly divided into the robot 101 and the controller 102. In FIG. 1, an impression part 111 of a force reference repeatedly intermittently supplies a stepwise force reference to the impedance controller 106. FIG. 5A shows an example (501) of a force reference which is outputted from the impression part 111 of the force reference. A force reference having a force Fstp and a predetermined time (T1) is outputted and, after that, the force reference is reset to zero. By repeatedly giving the force reference in the direction of the target workpiece 110b, the workpiece 110a to be gripped can be repeatedly pressed against the target workpiece 110b.

A measurement part 112 of evaluation data records time response (force response) of a force sensor feedback each time the pressing operation is performed, and automatically measures setting time, an overshoot amount, and the number of vibration times as evaluation data values for parameter adjustment from the time response.

Figure 5B:
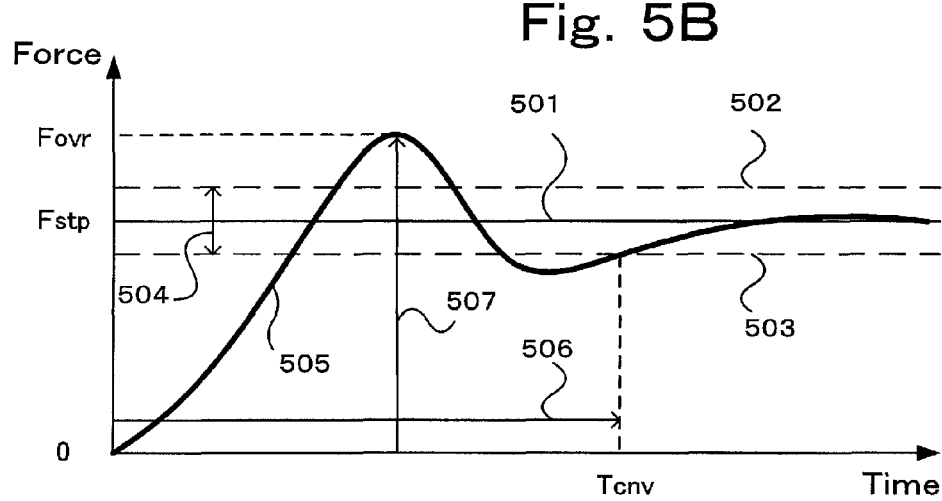
FIG. 5B shows principles of measuring evaluation data values of the embodiment together with a state of force response setting time and a state of an overshoot amount.
Figure 5C:
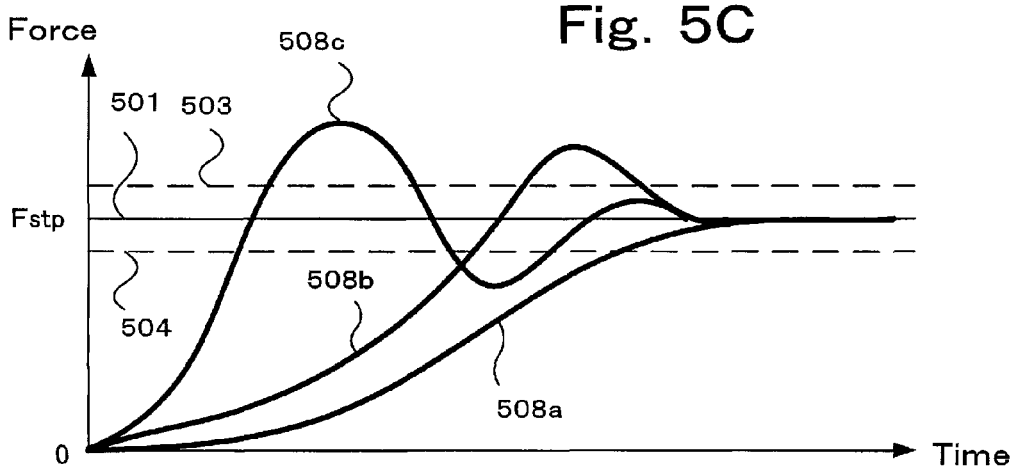
FIG. 5C shows principles of measuring evaluation data values of the embodiment together with a state of force response setting time, an overshoot amount, and the number of vibration times.

FIGS. 5B and 5C show principles of measuring the evaluation data values. For the setting time, first, an upper limit value 502 and a lower limit value 503 are determined for a stepwise force reference 501, and a setting range 504 is provided. Time 506 at which a force response 505 starts converging in the setting range 504 (enters the setting range and does not come out later) is setting time. As the overshoot amount, a value 507 at which the force response 505 exceeds the stepwise force reference and becomes the maximum is set. As the number of vibration times, the number of times the force response goes out of the setting range 504 is counted. Note that, only in the case where the force response exceeds the upper limit value 502 and the lower limit value 503 alternatively, the number of times is counted.

In the case of a force response 508a in FIG. 5C, it does not exceed the upper limit value 502 even once, so that the number of vibration times is zero. In the case of a force response 508b, after it exceeds the upper limit value 502 once, it is converged in the setting range 504 and does not go below the lower limit value 503, so that the number of vibration times is once. In the case of a force response 508c, it exceeds the upper limit value 502, passed through the setting range 504, goes below the lower limit value 503, and is set, so that the number of vibration times is two.

In FIG. 1, a setting part 113 of an allowable value sets allowable values for setting time and an overshoot amount. A calculator 114 of a viscosity parameter calculates a viscosity parameter D at which the setting time becomes the minimum in the repetitive pressing process in a state where the inertia parameter M is fixed. The details of the calculating method will be described later. An end determining part 115 determines whether the adjusting process is finished or continued by comparing the setting time (setting time adjustment value) obtained by a result of the viscosity parameter calculation and an overshoot amount (overshoot amount adjustment value) with the setting time allowable value and the overshoot amount allowable value which are set by the setting part 113 of allowable value. The method of determining the end will be described later. A calculator 116 of an inertia parameter changes the value of the inertia parameter M when the end determining part 115 determines that the parameter adjusting process continues. After the calculator 116 of the inertia parameter changes the inertia parameter, the calculator 114 of the viscosity parameter is re-executed. Until the end determining part 115 determines the end, the calculator of the viscosity parameter and the calculator of the inertia parameter are repeatedly executed.

A calculator 117 of an initial parameter calculates initial values of an inertia parameter and a viscosity parameter which are set at the time of parameter adjustment from weights of the end effector which is set and a gripped workpiece and a band of a positional control system of the robot manipulator.

According to the embodiment as described above, only by setting the weights of the end effector and a gripped workpiece and the band of the positional control system of the robot manipulator by the calculator of the initial parameters and setting allowable values of the setting time and the overshoot amount by the setting part of allowable values, the calculator of the viscosity parameter, the end determining part, and the calculator of the inertia parameter repeatedly execute adjustment of the viscosity parameter and the inertia parameter based on clear evaluation data. There is, consequently, an effect that a plurality of parameters can be adjusted without depending on skills of individuals and without special knowledge.

Figure 2:
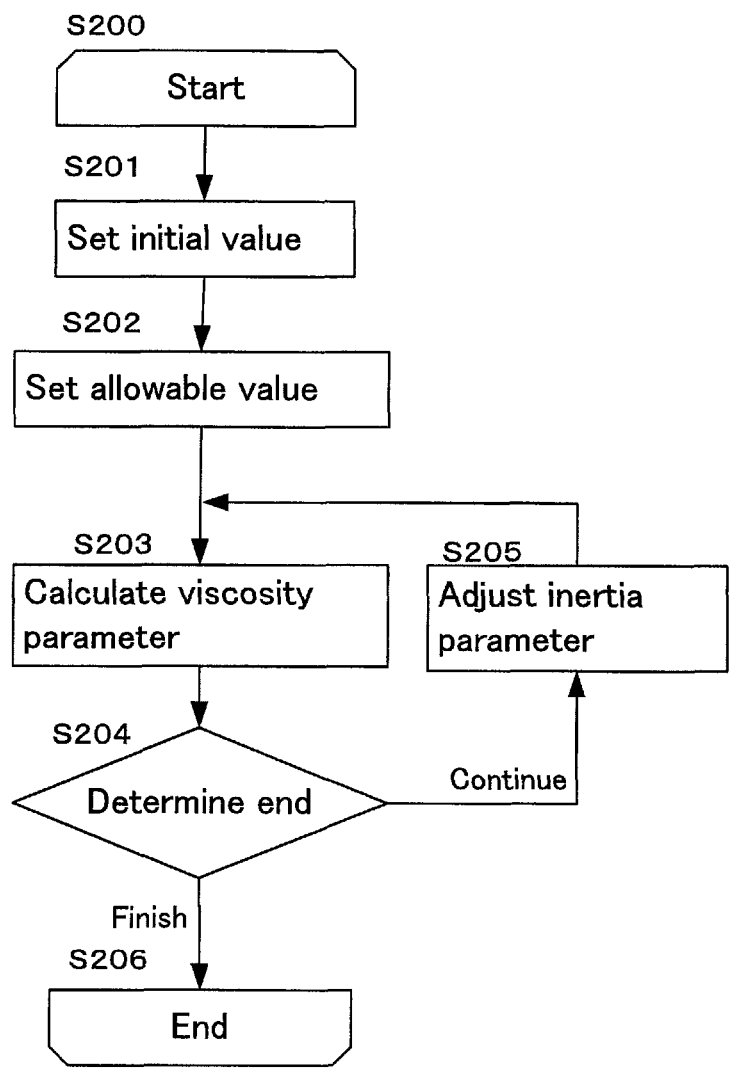
FIG. 2 is a flowchart of an impedance control parameter adjusting method according to the embodiment.

FIG. 2 is a flowchart of a method of adjusting parameters of the impedance control according to the embodiment.

In FIG. 2, in S201, initial values of the inertia parameter M and the viscosity parameter D of the impedance control are set in a coordinate axis direction of adjustment (pressing operation). In S202, allowable values of setting time of a force response and the overshoot amount are set. In S203, by executing the repetitive pressing operation in a state where the inertia parameter M is fixed, the viscosity parameter with which the setting time of the force response becomes minimum is calculated. In S204, whether the process is continued or finished is determined by comparing the setting time (setting time adjustment value) and the overshoot amount (overshoot amount adjustment value) obtained as a result of the calculation of the viscosity parameter. When it is determined in S204 that the process is continued, the inertia parameter is adjusted (finely adjusted) in S205, the flow returns to S203 and the viscosity parameter is re-calculated. The series of processes in S203 to S205 are repeatedly executed until the end is determined in S204.

Next, the details of the method of calculating the viscosity parameter in S203 will be described.

Figure 3:
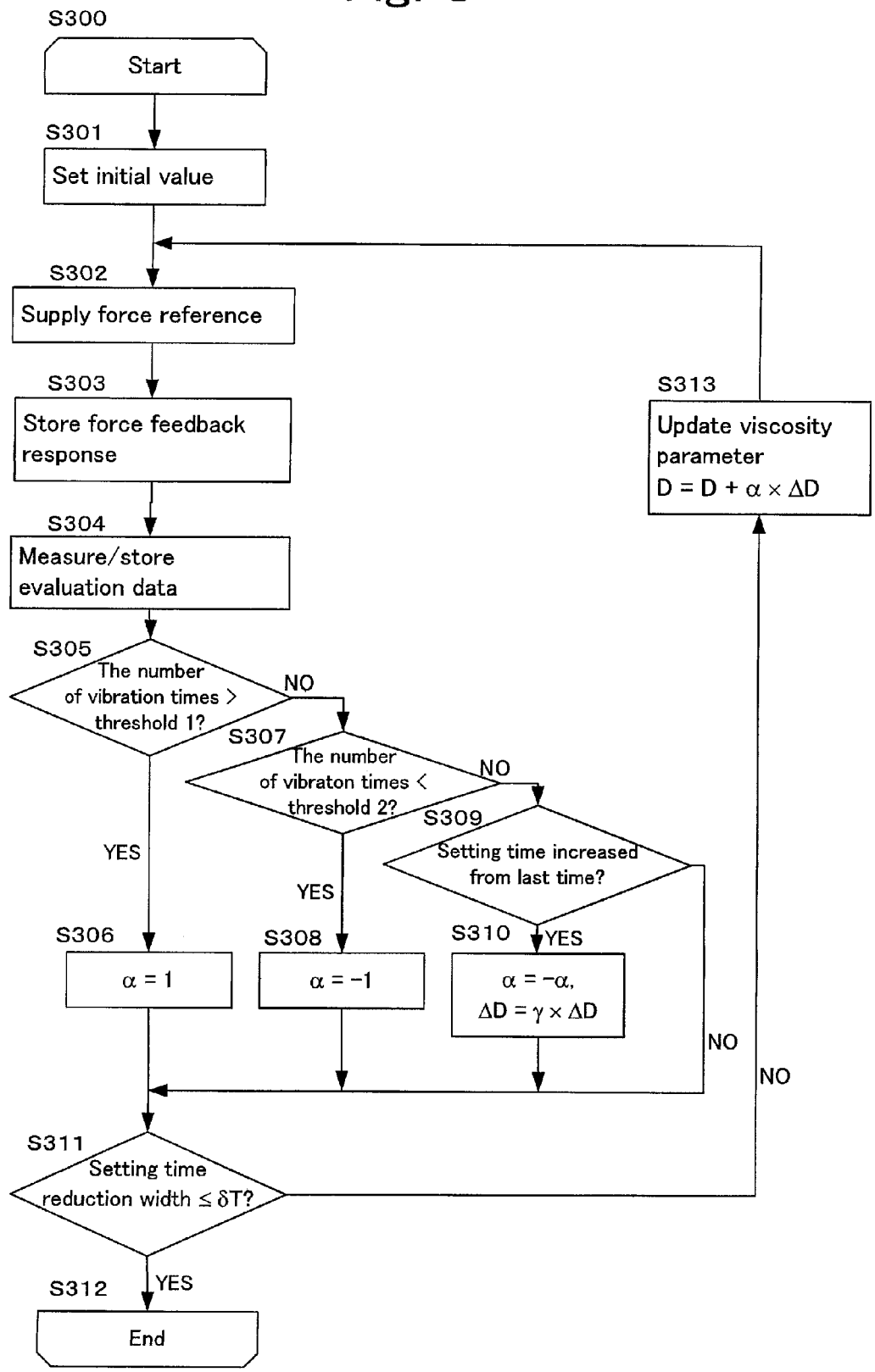
FIG. 3 is a flowchart of a viscosity parameter calculating process of the embodiment.

FIG. 3 shows a detailed flowchart of the viscosity parameter calculation S203.

In FIG. 3, in S301, initial values of the force Fstp of the force reference value 501, impression time T1 and T2, calculation width $\Delta D$ of the viscosity parameter D, calculation direction coefficient $\alpha$ (1 or −1), a decrease ratio $\gamma$ of the calculation width (less than 1), and a diminution threshold $\delta T$ of the setting time are set. In S302, the stepwise force reference 501 is supplied to the impedance controller 106 as shown in FIG. 5A. In S303, the time response (force response) of the force sensor feedback is recorded (measured stored). In S304, as shown in FIGS. 5B and 5C, the setting time, the overshoot amount, and the number of vibration times are automatically measured with respect to the recorded force response.

In S305, whether the automatically measured number of vibration times exceeds a preset threshold 1 (for example, 2) or not is determined. If the number of vibration times exceeds the threshold 1, the calculation direction coefficient $\alpha$ is set (incremented) to 1 (S306). If the number of vibration times is equal to or less than the threshold 1, whether the number of vibration times is below a preset threshold 2 (for example, 1) or not is determined in S307. If the number of vibration times is below the threshold 2, the calculation direction coefficient $\alpha$ is set (decremented) to −1 (S308). When the number of vibration times is large (exceeds the threshold 1), it is considered that the control system at the time of pressing has an insufficient damping. Consequently, it means that the viscosity parameter D is increased at the next pressing. When the number of vibration times is small (below the threshold 2), it is considered that the control system at the time of pressing has an over damping. Consequently, it means that the viscosity parameter is decreased at the next pressing.

If the number of vibration times is equal to or larger than the threshold 2 and equal to or less than the threshold 1, whether the setting time has increased more than that in the pressing of last time or not is determined in S309. If the setting time has increased, the sign of the calculation direction coefficient $\alpha$ is inverted and, further, $\alpha$ value obtained by multiplying the calculation width $\Delta D$ with the damping rate $\gamma$ is re-set as the new calculation width $\Delta D$ (S310).

Next, whether or not the diminution of the setting time since the pressing of last time is equal to or less than the threshold $\delta T$ is determined in S311. If the diminution of the setting time is equal to or less than the threshold $\delta T$, it is considered that the setting time has sufficiently decreased, and the process is finished (S312). If the diminution of the setting time exceeds the threshold $\delta T$, the viscosity parameter D is updated based on the following equation in S313.

$$D(\text{updated value}) = D(\text{value at present}) + \alpha \times \Delta D \qquad (3)$$

After updating the viscosity parameter D, the flow returns to S302, the force reference is given again, and the above-described processes are repeated.

Figure 6:
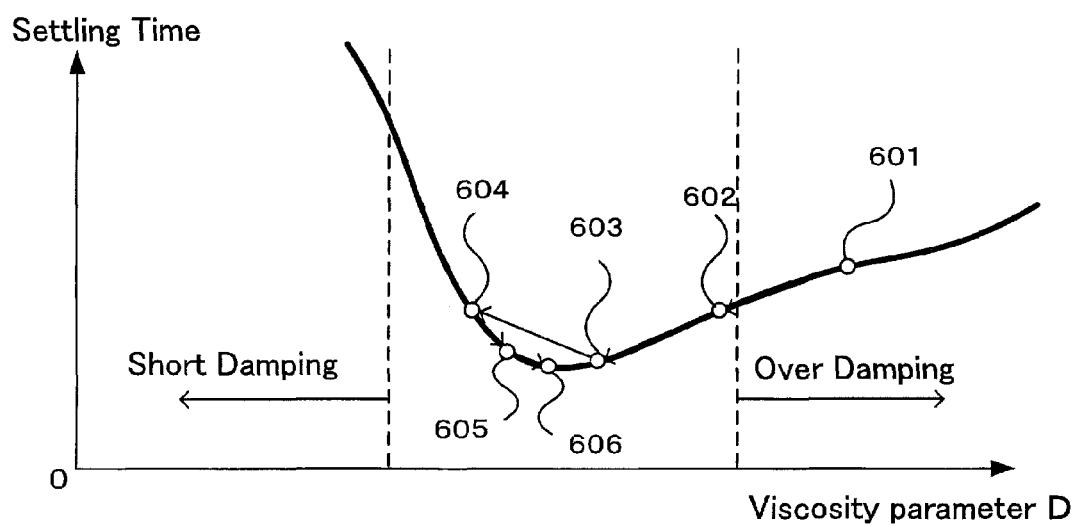
FIG. 6 shows a state where calculation of a viscosity parameter of the embodiment advances.

FIG. 6 schematically shows a state where the above-described viscosity parameter calculation advances. In FIG. 6, the horizontal axis represents the viscosity parameter, and the vertical axis represents a relation of the setting time when the pressing is executed with the viscosity parameter. As shown in the diagram, it is considered that an optimum viscosity parameter at which the setting time becomes minimum exists, and the local minimal value does not exist. Symbols 601 to 606 indicate the calculation order. Symbol 601 indicates the viscosity parameter and the measured setting time at the time of the first pressing. Symbol 602 indicates the second time, and symbol 603 indicates the third time (the subsequent numbers indicate similarly). In the pressing of the first time, the number of vibration times is less than the threshold 2 and the damping is excessive. Consequently, the calculation direction coefficient $\alpha$ is set to −1, and the pressing of the second and third times is executed. In this case, the pressing is executed by decreasing the viscosity parameter D only by the initially set calculation width $\Delta D$. Although the setting time decreases until the third times, it starts increasing at the fourth time. In the case where the setting time starts increasing, the sign of the calculation direction coefficient $\alpha$ is inverted, and the calculation width $\Delta D$ is multiplied with the decrease ratio (for example, 0.3). Consequently, at the fifth time and subsequent times, as shown in FIG. 6, the calculation is advanced with a calculation width finer than that up to the fourth time in the direction of increasing D ($\alpha=1$). As obviously understood from the diagram, by repeating such a process, the calculation is gradually converged to a state where the setting time is the minimum. When the diminution of the setting time becomes equal to or less than the threshold $\delta T$, the calculation is finished (depending on setting of the threshold $\delta T$, the calculation is finished at the sixth time).

Even in the case where the damping is insufficient (the number of vibration times>threshold 1), the above-described calculating process similarly functions and the viscosity parameter with which the setting time becomes the minimum can be calculated.

The details of the viscosity parameter calculating process have been described with reference to FIG. 3. Next, the details of the end determination in S204 and the inertia parameter adjustment in S205 in FIG. 2 will be described.

Figure 4:
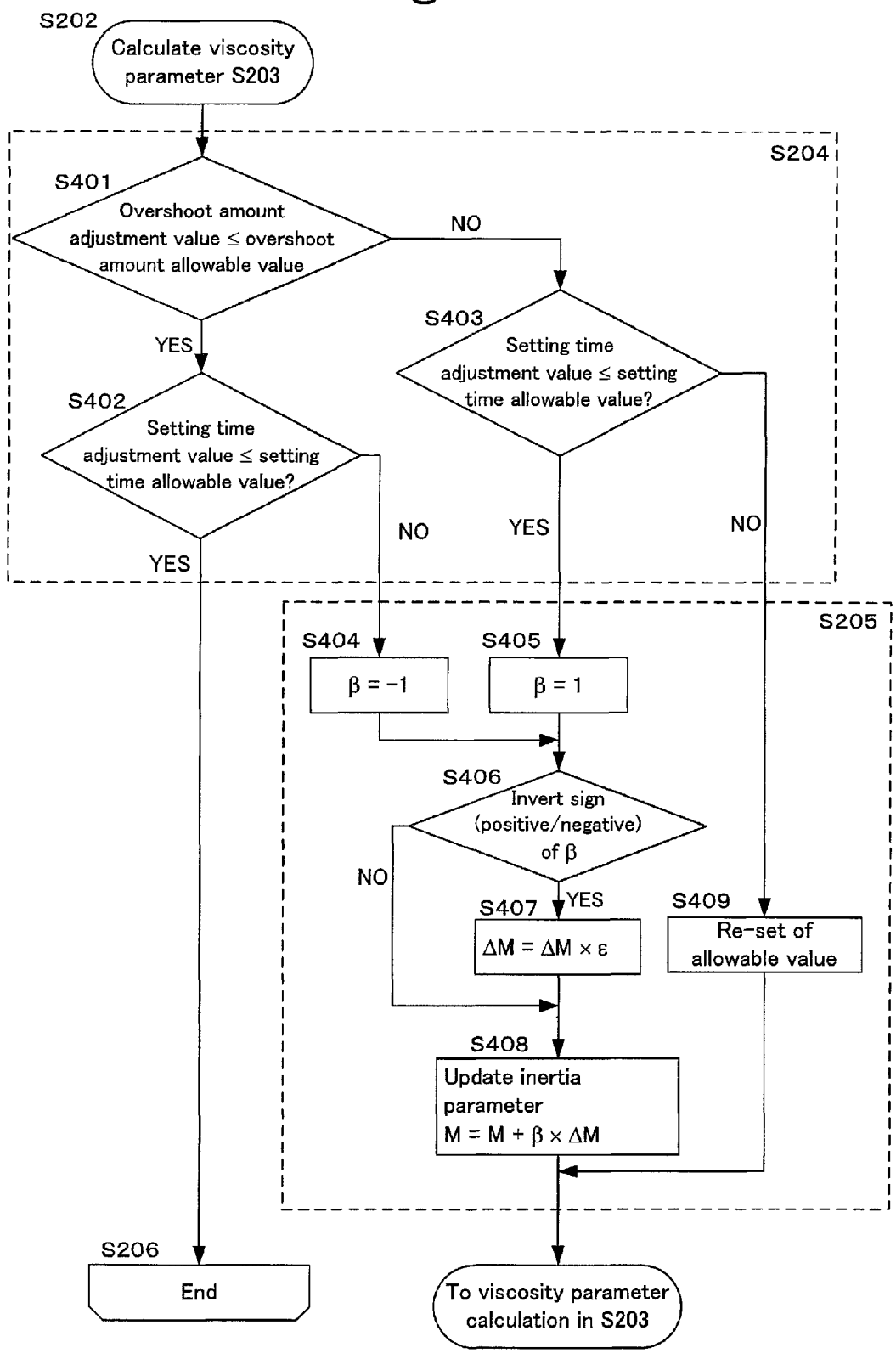
FIG. 4 is a flowchart of an end determining process and an inertia parameter calculating process of the embodiment.

FIG. 4 is a detailed flowchart of the end determination in S204 and the inertia parameter adjustment S205.

In FIG. 4, ranges indicated by broken lines correspond to S204 and S205. First, the details of the end determination S204 will be described. In S401, whether the adjustment value of the overshoot amount obtained as a result of the viscosity parameter calculation in S203 (FIG. 2) is equal to or less than the overshoot amount allowable value which is set in S202 or not is determined. If the adjustment value is equal to or less than the allowable value, in S402, whether the setting time adjustment value is equal to or less than the setting time allowable value or not. If both the overshoot amount and the setting time are equal to or less than the allowable values, it is determined that proper adjustment is performed, and the process is finished (S206). If the overshoot amount adjustment value is equal to or less than the allowable value but the setting time adjustment value exceeds the allowable value, the inertia parameter M is too large, so that the calculation direction coefficient β of the inertia parameter is set to −1 (S404).

On the other hand, also in the case where it is determined in S401 that the overshoot amount adjustment value exceeds the allowable value, similarly, whether the setting time adjustment value is equal to or less than the allowable value or not is determined (S403). If the overshoot amount adjustment value exceeds the allowable value and the setting time adjustment value is equal to or less than the allowable value, the inertia parameter M is too small, so that the calculation direction coefficient β of the inertia parameter is set to 1 (S405). In S406, whether the sign (positive/negative) of the calculation direction coefficient β has been changed or not is determined. If the sign is changed (inverted), a value obtained by multiplying the decrease ratio ε (less than 1) with the calculation width ΔM of the inertia parameter is reset as a new calculation width ΔM (S407). That is, the inertia parameter is updated based on the following equation in S408, and the flow returns to the viscosity parameter calculation S203.

$$M(\text{updated value}) = M(\text{value at present}) + \beta \times \Delta M \quad (4)$$

On the other hand, if both of the overshoot amount adjustment value and the setting time adjustment value exceed the allowable values, the setting of the allowable values are too strict, so that the allowable values are reset in the lessening direction in S409.

FIG. 10 is a flowchart of the calculator of the initial parameters. The initial values of the inertia parameter M and the viscosity parameter D determined by the calculator of the initial parameters are set in the initial value setting in S201 in the method of adjusting the parameters in the impedance control.

In S702, the sum MO of weight of the end effector and the gripped workpiece is set. In S703, the band ωc of the positional control system of the robot is set. In S704, the damping coefficient is set. In S705, the sum MO of the weight of the end effector and the gripped workpiece set in S702 is determined as the initial value of the inertia parameter M at the time of adjustment. In S704, the rigidity parameter K is calculated by the following equation using the inertia parameter M determined in S705 and the band ωc of the positional control system of the robot which is set in S703.

$$K = M(\omega c)^2 \quad (5)$$

In S707, the initial value of the viscosity parameter D at the time of adjustment is calculated by the following equation using the inertia parameter M determined in S703, the rigidity parameter K determined in S704, and the damping coefficient set in S704.

$$D = \zeta \times 2(MK)^{1/2} \quad (6)$$

As described above, according to the embodiment, initial values of the inertia parameter and the viscosity parameter at the time of adjustment are automatically set, the calculation direction and the calculation width of the viscosity parameter are automatically adjusted according to increase/decrease in the number of vibration times and the setting time of the force response at the time of pressing, and the calculation direction and the calculation width of the inertia parameter are automatically adjusted according to the adjustment values of the overshoot amount and the setting time. There is consequently an effect that optimum parameters can be always adjusted in short time is produced.

According to the apparatus and method for adjusting parameters of impedance control of the embodiment, optimum impedance control parameters can be adjusted according to a target work (assembling work, burr removing work, or the like), a target workpiece (material), and a robot (including an end effector).

Obviously, numerous modifications and variations of the present invention are possible in light of the above teachings. It is therefore to be understood that within the scope of the appended claims, the present invention may be practiced otherwise than as specifically described herein.

What is claimed as new and is desired to be secured by Letters Patent of the United States is:

1. A method for adjusting parameters of impedance control, comprising:

calculating initial values of an inertia parameter and a viscosity parameter which are set at a time of parameter adjustment;

setting an overshoot amount allowable value as an allowable maximum value of an overshoot amount of a time response of a force feedback from a force sensor provided for an end effector of a robot manipulator, and a setting time allowable value as an allowable maximum value of a setting time of the time response of the force feedback;

calculating a viscosity parameter with which the setting time is shortest while fixing the inertia parameter;

comparing an overshoot amount adjustment value and a setting time adjustment value which are obtained from a result of the calculating of the viscosity parameter with the overshoot amount allowable value and the setting time allowable value, respectively, to determine whether a repeating process is finished or continued; and adjusting, if it is determined that the repeating process is continued, the inertia parameter or one of the overshoot amount allowable value and the setting time allowable value to re-execute the calculating of the viscosity parameter, the adjusting of the inertia parameter or one of the overshoot amount allowable value and the setting time allowable value including changing the inertia parameter or lessening at least one of the overshoot amount allowable value and the setting time allowable value, wherein the calculating of the viscosity parameter includes setting an initial value of a viscosity parameter D, a calculation width ΔD of the viscosity parameter D, a calculation direction coefficient α of the viscosity parameter D, a decrease ratio of the calculation width ΔD, and a threshold related to a change amount of the setting time, supplying a stepwise force reference intermittently to impedance control to press a workpiece gripped by the end effector against a target workpiece, measuring a time response of a force feedback at a time of pressing to store the time response of the force feedback, measuring the setting time of the time response, the overshoot amount of the time response, and a number of vibration times of the time response as evaluation values for the time response of the force feedback to store the setting time, the overshoot amount, and the number of vibration times, setting the calculation direction coefficient α to 1 if the number of vibration times is larger than a first threshold, setting the calculation direction coefficient α to −1 if the number of vibration times is smaller than a second threshold, inverting a sign of the calculation direction coefficient α if the number of vibration times is equal to or larger than the second threshold and is equal to or less than the first threshold and if the setting time has increased as compared with the setting time of last time, multiplying a calculation width ΔD with a damping rate to update the calculation width ΔD if the number of vibration times is equal to or larger than the second threshold and is equal to or less than the first threshold and if the setting time has increased as compared with the setting time of last time, updating the viscosity parameter D by D=D+α×ΔD to return to the supplying of the stepwise force reference if a change amount of the setting time from last time of the setting time is larger than the threshold related to the change amount of the setting time, and finishing a process if the change amount ΔT is equal to or less than the threshold related to the change amount of the setting time.

2. The method according to claim 1, wherein the measuring of the setting time, the overshoot amount, and the number of vibration times includes setting, as the setting time, a time period for which the time response of the force feedback is converged within a setting range having upper and lower limits designated using the stepwise force reference as a center of setting range.

3. The method according to claim 2, wherein the measuring of the setting time, the overshoot amount, and the number of vibration times includes measuring a number of times at which the time response of the force feedback exceeds the setting range as a first number of times, and a number of times at which the time response of the force feedback is below the setting range as a second number of times alternately, and setting a sum of the first number of times and the second number of times as the number of vibration times.

4. The method according to claim 1, wherein the comparing of the overshoot amount adjustment value and the setting time adjustment value includes determining end of the calculating of the viscosity parameter in a first case where only if the overshoot amount adjustment value is equal to or less than the overshoot amount allowable value and the setting time adjustment value is equal to or less than the setting time allowable value, and determining continuation of the calculating of the viscosity parameter in a second case other than the first case.

5. The method according to claim 1, wherein the adjusting of the inertia parameter or one of the overshoot amount allowable value and the setting time allowable value includes setting an initial value of an inertia parameter M, a calculation width ΔM of the inertia parameter M, a calculation direction coefficient β, and a decrease ratio of the calculation width ΔM, executing the calculating of the viscosity parameter, setting the calculation direction coefficient β to −1 if the overshoot amount adjustment value is equal to or less than the overshoot amount allowable value and if the setting time adjustment value is larger than the setting time allowable value, setting the calculation direction coefficient β to 1 if the overshoot amount adjustment value is larger than the overshoot amount allowable value and if the setting time adjustment value is equal to or less than the setting time allowable value, multiplying the calculation width ΔM with the decrease ratio to update, if a sign of the calculation direction coefficient β is inverted, updating the inertia parameter with M=M+β×ΔM to return to the executing of the calculating of the viscosity parameter after the multiplying of the calculation width ΔM, and re-setting, if the overshoot amount adjustment value is larger than the overshoot amount allowable value and if the setting time adjustment value is larger than the setting time allowable value, one of the overshoot amount allowable value and the setting time allowable time to an adjustment value to return to the executing of the calculating of the viscosity parameter.

6. The method according to claim 1, wherein the calculating of the initial values comprises setting weights of the end effector and a gripped workpiece as the initial value of the inertia parameter at the time of the parameter adjustment, setting a band of a positional control system of the robot manipulator, calculating a rigidity parameter from the inertia parameter and the band, setting a damping coefficient, and calculating the viscosity parameter from the inertia parameter, the rigidity parameter, and the damping coefficient as an initial value of the viscosity parameter at the time of parameter adjustment.

* * * * *